(12) United States Patent
Hsu

(10) Patent No.: US 11,128,558 B2
(45) Date of Patent: Sep. 21, 2021

(54) AUTOMATIC ROUTING CONFIGURATION BETWEEN HOSTS AND NETWORK LAYER DEVICES

(71) Applicant: Arista Networks, Inc., Santa Clara, CA (US)

(72) Inventor: Fred Hsu, Sunnyvale, CA (US)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 16/563,631

(22) Filed: Sep. 6, 2019

(65) Prior Publication Data

US 2021/0075716 A1 Mar. 11, 2021

(51) Int. Cl.
| | |
|---|---|
| *H04L 12/751* | (2013.01) |
| *H04L 12/721* | (2013.01) |
| *H04L 12/717* | (2013.01) |
| *H04L 12/707* | (2013.01) |
| *H04L 12/725* | (2013.01) |
| *H04L 12/741* | (2013.01) |
| *H04L 12/24* | (2006.01) |

(52) U.S. Cl.
CPC ............ *H04L 45/22* (2013.01); *H04L 45/02* (2013.01); *H04L 45/30* (2013.01); *H04L 45/42* (2013.01); *H04L 45/66* (2013.01); *H04L 45/74* (2013.01); *H04L 41/0803* (2013.01)

(58) Field of Classification Search
None
See application file for complete search history.

(56) References Cited

U.S. PATENT DOCUMENTS

| | | | | |
|---|---|---|---|---|
| 2006/0002324 A1* | 1/2006 | Babbar | ............... | H04L 61/2092 370/325 |
| 2006/0002384 A1* | 1/2006 | Chen | ................... | H04L 12/4604 370/389 |
| 2010/0085920 A1* | 4/2010 | Chari | .................. | H04L 12/2856 370/328 |
| 2010/0250747 A1* | 9/2010 | Karaoguz | ............. | H04L 47/824 709/226 |
| 2012/0259965 A1* | 10/2012 | Tsuzuki | ............... | H04L 41/0213 709/223 |
| 2012/0281585 A1* | 11/2012 | Zhang | ............... | H04W 36/0033 370/252 |
| 2016/0063088 A1* | 3/2016 | Pang | ..................... | H04L 67/303 707/737 |
| 2017/0250887 A1 | 8/2017 | Sadana et al. | | |
| 2020/0143087 A1* | 5/2020 | Schroeder | ............. | G06F 21/645 |
| 2020/0295877 A1* | 9/2020 | Chaturvedi | ........... | H04L 67/306 |

* cited by examiner

*Primary Examiner* — Joshua Joo
(74) *Attorney, Agent, or Firm* — Fountainhead Law Group P.C.

(57) ABSTRACT

Systems and methods are described herein for configuring network layer connectivity between a network layer device and a host. A network controller receives, from the host, data link layer information about a network layer device and accordingly determines network layer information about the network layer device. The network controller configures the host and the network layer device to route traffic to each other over the network layer, by transmitting, to the host, the network layer information of the network layer device and by transmitting, to the network layer device, the network layer information of the host.

20 Claims, 8 Drawing Sheets

300

| Host | Network Identifier | Data Link Identifier |
|---|---|---|
| Host 210 | 192.168.1.1 | A1-11-11-A1-11-11 |
| Host 212 | 192.168.1.2 | A2-22-22-A2-22-22 |
| Host 214 | 192.168.1.3 | A3-33-33-A3-33-33 |

| L3 Device | Network Identifier | Data Link Identifier |
|---|---|---|
| L3 Device 206 | 192.168.10.1 | B1-11-11-B1-11-11 |
| L3 Device 208 | 192.168.10.2 | B2-22-22-B2-22-22 |

FIG. 4

AUTOMATIC ROUTING CONFIGURATION BETWEEN HOSTS AND NETWORK LAYER DEVICES

BACKGROUND

The present disclosure relates to establishing peering in a network, and more particularly, to peering devices in a network featuring a distributed container cluster.

SUMMARY

In some computer networks, border gateway protocol (BGP) peering must be established between switches and hosts to establish network layer (L3) connectivity between those devices. Establishing a BGP peering session requires configuring both devices in the peering session to have the data link layer identifier (e.g., a media access control (MAC) address, a hostname, etc.) and the network layer identifier (e.g., an internet protocol (IP) address) of the other device. While various procedures have been developed to automate configuring data link layer (L2) connectivity between devices on a network, configuring L3 connectivity between hosts and switches is often a manual process that is inefficient, especially in large-scale networks.

Network controller devices may be used to automate configuring L3 connectivity between switches on a network. This is possible because the switches are all pre-configured to connect to, and exchange data (particularly data link layer identifiers and network layer identifiers) with, the network controller. Each switch also provides the network controller with the data link layer identifiers that the switch detects on its network interfaces (e.g., ports). This enables the network controller to then determine which switches are connected to each other, and to provide the network layer identifiers to the various switches to establish BGP peering sessions between the connected switches.

This process enables automated establishment of BGP peering sessions between switches, but it does not address the problem of establishing BGP peering sessions between a host and a switch. While it is possible to add or replace a switch and automatically configure BGP peering sessions between the existing switches and a new or replacement switch, the task of establishing BGP peering sessions between the new or replacement switch and the hosts connected to that switch remains a manual process. Similarly, configuring a BGP peering session between a switch and a new host connected to the switch also remains a manual process. In most network configurations, hosts outnumber switches—often by a significant number—and hosts are often added to or replaced on the network much more frequently than switches. In large-scale deployments (e.g., data centers, corporate networks, etc.), manually configuring BGP peering sessions for every host and its connected switch is an extremely laborious and time-intensive process and can increase the chances of configuration errors.

Systems and methods are described herein for addressing these problems by configuring BGP peering sessions (and thus network layer connectivity) between network layer devices, such as switches, and hosts using a network controller. In particular, disclosed embodiments enable hosts to communicate directly with a dedicated network controller. The network controller acquires configuration information pertaining to all hosts and transmits the configuration information to the hosts and the network layer devices to which the hosts are connected. The configuration process is thus made more efficient and accurate by reducing the possibility of configuration errors caused by manual data entry because the network controller provides the hosts and network layer devices with the correct configuration information, which it received from the other device in the peering relationship.

For example, the network controller receives, from the host, a data link layer identifier of a switch to which the host is connected and the data link layer identifier and the network layer identifier of the host. The network controller similarly receives data link layer identifiers from the switch identifying devices (hosts and/or switches) connected to network interfaces of the switch. Additionally, the network controller receives, from the switch, the data link layer identifier and the network layer identifier of the switch. By receiving the data link layer identifier of the switch to which the host is connected, and the data link layer identifiers of all the devices (switches and/or hosts) connected to the switch, the network controller can determine which devices are connected to each other. The network controller then determines the network layer identifiers of the host and switch that are connected to each other and generates and transmits a routing configuration message (including the network layer identifier of the other device in the peering relationship) to both the host and the switch, thereby automating BGP peering (and establishing network layer connectivity) between the host and switch.

A host is conventionally unable to communicate with a network controller that manages switches. One approach to enable a host to communicate with the network controller is by installing a network operating system that provides drivers that can manage the command-line interface (CLI) of the host, the switching application-specific integrated circuits (ASICs), and the routing protocols for communication.

In some embodiments, the host, switch, and network controller may be part of a distributed container cluster, and the hosts may be referred to as worker container nodes. In the context of container networking, a container programmed to establish network communications between the host and the network controller is installed on the host. Such a container may be distributed by a master container node that determines which containers to deploy on the worker container nodes in the container cluster.

A routing container implemented on the host generates a first message indicating a host network layer identifier of the host and a switch data link layer identifier of a switch. The routing container transmits the first message to a network controller and subsequently receives, from the network controller, a second message for configuring the host to communicate with the switch using a switch network layer identifier of the switch. The second message may then be used by the host to establish network layer connectivity with the switch based on the switch network layer identifier. For example, the configuration commands in the second message may be executed by the routing container that can manage the CLI of the host.

In at least one embodiment, a network controller receives a message from a host, the message including the host's network layer identifier and the switch's data link layer identifier. The network controller determines the switch's network layer identifier from the switch's data link layer identifier and transmits, back to the host, a message for configuring the host to communicate with the switch using the switch's network layer identifier. This particular message may include the respective network layer identifiers of the switch and the host and is utilized by the host to establish a network layer peer session (e.g., BGP peering session) with the switch. Additionally, the network controller transmits a message to the switch, the message including the respective network layer identifiers of the switch and the host. The switch may then store the respective network layer identifiers in a routing table entry at the switch.

In terms of determining the switch's network layer identifier from the switch's data link layer identifier, the network controller may rely on an internal table that lists, for each device in the network, a data link layer identifier and a network layer identifier. The network controller may, for example, identify, in the table, an entry of the switch associated with the switch's data link layer identifier and then determine, based on the table, the network layer identifier of the switch.

In some embodiments, the network controller may receive, from the switch, a message including the switch's network layer identifier and the host's data link layer identifier. Based on this message, the network controller determines that the switch and the host are to be connected to each other. For example, the network controller determines whether the host's data link layer identifier received from the switch and the host's network layer identifier received from the host correspond to the same host. The network controller may also determine whether the switch's data link layer identifier received from the host and the switch's network layer identifier received from the switch correspond to the same switch. In response to determining that the respective identifiers correspond to the same host/switch, the network controller initiates the transmission of configuration messages.

The connection between the host and the switch may be non-binding; if the host disconnects with the switch, the configuration settings sent by the network controller may be removed at the host and the switch. This allows the host to reconnect with a different switch at a later time. The network controller facilitates this by determining whether a threshold period of time (e.g., a time-out) has transpired since a time when a BGP peering session between the host and the switch was disconnected. In response to determining that the threshold period of time has transpired, the network controller transmits, to the host, a message to reconfigure the host to cease network layer communication with the switch. The message to reconfigure the host is utilized by the host, which removes the switch's network layer identifier from a routing table on the host. The network controller may also transmit a message to the switch to reconfigure the switch to cease network layer communication with the host, by removing the routing table entry at the switch.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 shows an illustrative table that lists the data link layer and network layer identifiers of hosts in a network, in accordance with some embodiments of the disclosure;

FIG. 4 shows an illustrative table that lists the data link layer and network layer identifiers of network layer devices in a network, in accordance with some embodiments of the disclosure;

DETAILED DESCRIPTION

Figure 1:
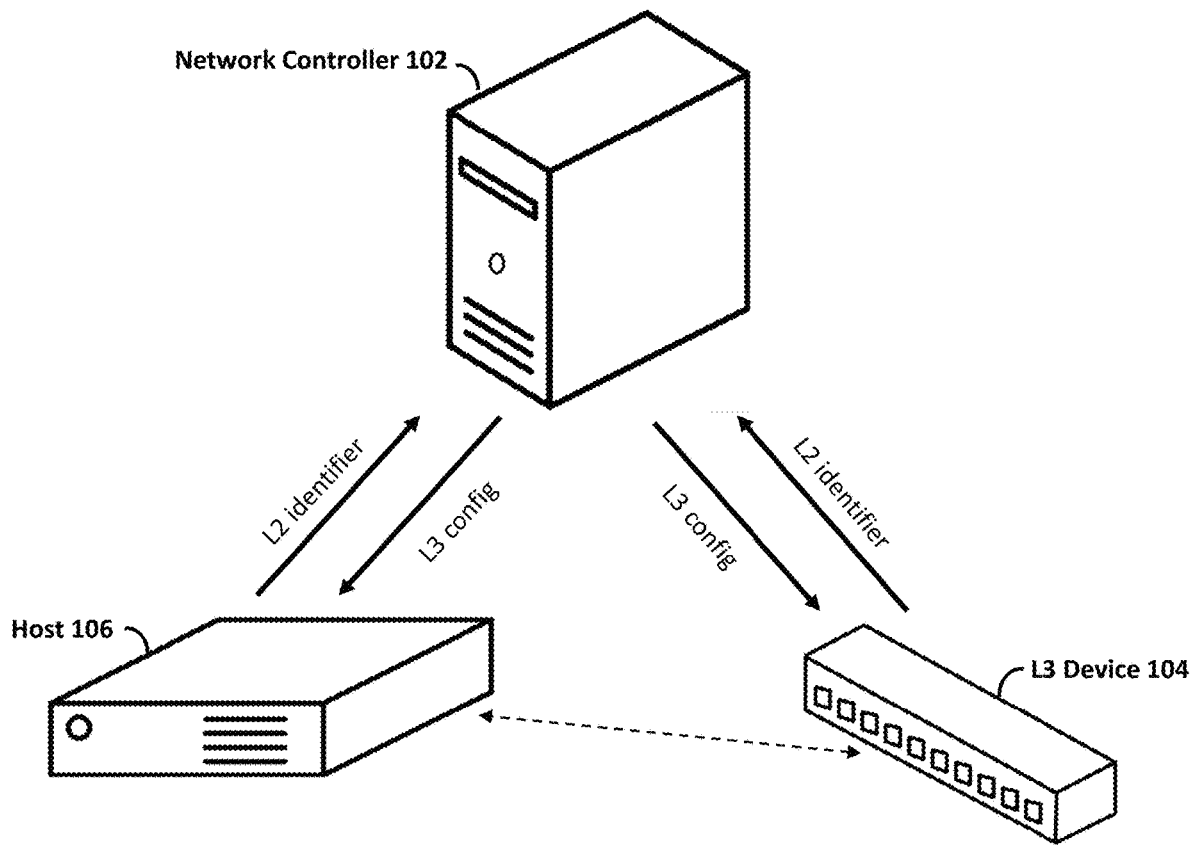
FIG. 1 shows an illustrative network in which a network controller configures network layer connectivity between a network layer device and a host, in accordance with some embodiments of the disclosure.

FIG. 1 shows illustrative network 100, in which network controller 102 configures network layer connectivity between network layer (e.g., layer 3 (L3)) device 104 and host 106, in accordance with some embodiments of the disclosure. Network 100 depicts only network controller 102, L3 device 104 and host 106 for simplicity and may include additional network device(s) and/or hosts. As used herein, "host" refers to any device on a network that is not part of the network infrastructure. "Network device" refers to devices that are part of the network infrastructure. Host 106 may be a computer in network 100. For example, in the context of data center computing, host 106 may be a server that offers information, services, and applications to other devices of network 100. L3 device 104, which is sometimes referred to herein as a network layer device, may be a router, a switch, or any other network device that routes network traffic based on network layer addresses. In the context of data center computing, for example, L3 device 104 may be a top-of-rack (ToR) switch that handles frame and packet forwarding in network 100. Network controller 102 is a computer that manages the connections in network 100. In some embodiments, network controller 102 also collects real-time data regarding network 100's health from network devices, such as L3 device 104, using streaming network telemetry.

Host 106 and L3 device 104 may detect each other using the link layer discovery protocol (LLDP). LLDP is a protocol used by network devices for advertising identity, capabilities, and neighbors on a local area network. L3 device 104 may, for example, receive an Ethernet frame structured as [Preamble|Destination MAC|Source MAC|Ethertype|Chassis ID TLV|Port ID TLV|Time to live TLV|Optional TLVs|End of LLDPDU TLV|Frame check sequence] from host 106. From this frame, L3 device 104 determines the data link layer identifier of host 106, namely, the source MAC. Likewise, L3 device 104 may advertise its presence to other devices in network 100, allowing a device such as host 106 to resolve the data link layer identifier of L3 device 104 via LLDP.

In some embodiments, a host is unable to communicate directly with a network controller and needs to be manually configured to establish a peering session with a network layer device. To automate the peering process using the methods described herein, communication between a host and a network controller needs to be initiated. This is made possible by installing a network operating system on the host. Referring to network 100, host 106 is able to communicate with network controller 102 using a network operating system installed on host 106. The network operating system provides drivers for managing the CLI, the ASICs, and the routing protocols for communication. The network operating system on host 106 may, for example, communicate with network controller 102 using a remote produce call (RPC) system such as gRPC. An RPC allows a computer program to execute a procedure in a different address space, such as a computer on a shared network, via a request—response protocol. In a request-response protocol, a first computer sends a request for data to a second computer and the second computer responds to the request.

For example, host 106 may transmit a message to network controller 102 requesting a routing configuration that enables network layer peering with L3 device 104. Host 106 may identify L3 device 104 in the message using the data link layer identifier of L3 device 104 (as resolved using LLDP) and may identify itself using its own data link layer and network layer identifiers. L3 device 104 may similarly transmit a message to network controller 102 requesting a routing configuration that enables network layer peering with host 106. The message from L3 device 104 may identify host 106 using the resolved data link layer identifier of host 106 and may identify L3 device 104 using the data link layer and network layer identifiers of L3 device 104.

Network controller 102 receives the respective RPC messages and determines whether host 106 is to be peered with L3 device 104. In some embodiments, network controller 102 stores, in memory, the data link layer and network layer identifiers received from L3 device 104 and host 106. In response to receiving, from host 106, the message providing the data link layer identifier of L3 device 104, network controller 102 determines the network layer identifier of L3 device 104. The network layer information may already be stored in memory at network controller 102, or network controller 102 may wait for L3 device 104 to provide the network layer information. In a scenario where the information is not readily available at network controller 102, network controller 102 determines the network layer identifier of L3 device 104 from the message received from L3 device 104 (in which L3 device 104 identifies itself using data link layer and network layer identifiers). For example, network controller 102 may determine that the data link layer identifier in the message from host 106 matches the data link layer identifier of L3 device 104 as listed in the message from L3 device 104.

Network controller 102 subsequently determines a peering configuration for host 106 and L3 device 104. For example, network controller 102 may determine that host 106 and L3 device 104 should be peered using the Border Gateway Protocol (BGP). BGP is a protocol designed to exchange routing information among autonomous systems (AS) on the Internet. BGP performs routing based on paths and network policies configured by a network administrator (e.g., network controller 102). BGP peers are established by configuration commands that initiate a Transmission Control Protocol (TCP) connection.

Having the network layer identifier of host 106, network controller 102 responds to the RPC message from L3 device 104 with a message including commands for establishing BGP peering with host 106. For example, network controller 102 may transmit, to L3 device 104, code structured as:
switch(config) # router bgp [AS #]
switch(config-router-bgp) # neighbor [Network layer Identifier of Host 106] remote-as [AS #]
switch(config-router-bgp) #

The neighbor remote-as command establishes host 106 as a static neighbor of L3 device 104 in the autonomous system of which L3 device 104 and host 106 are a part. In response to receiving the message including commands for establishing peering, L3 device 104 may execute the commands in a CLI and update a routing table at L3 device 104 accordingly. Network controller 102 may similarly transmit a message to host 106 with the network layer identifier of L3 device 104. For example, network controller 102 may transmit code structured as:
switch(config) # router bgp [AS #]
switch(config-router-bgp) # neighbor [Network layer Identifier of L3 Device 104] remote-as [AS #]
switch(config-router-bgp) #

The network operating system at host 106 receives the message from network controller 102 and executes the commands in a CLI as well. Thus, network layer connectivity between L3 device 104 and host 106 is established.

Figure 2:
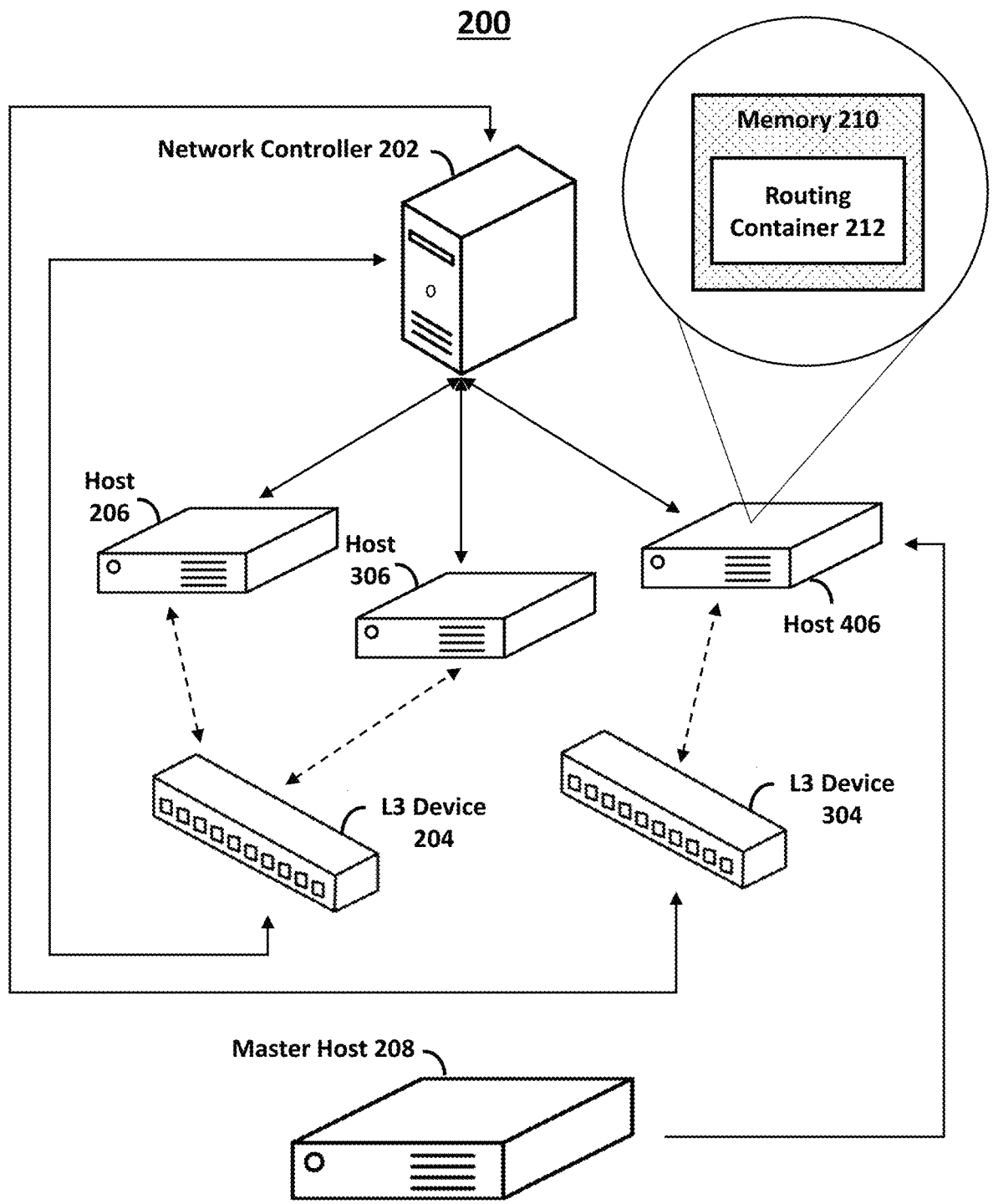
FIG. 2 shows an illustrative network in which a network controller configures network layer connectivity between multiple network layer devices and hosts, in accordance with some embodiments of the disclosure.

FIG. 2 shows illustrative network 200 in which a network controller configures network layer connectivity between multiple network layer devices and hosts, in accordance with some embodiments of the disclosure. In example 200, hosts 206, 306, and 406 are connected to master host 208. For simplicity, only a single arrow is depicted between master host 208 and host 406. Master host 208 can, however, communicate directly and independently with any of the hosts depicted in example 200. In the context of container networking, master host 208 represents a master container node and hosts 206, 306, and 406 represent worker container nodes. A master container node manages the functionality of the worker container nodes by transmitting containers to specific worker container nodes. Hosts 206, 306, and 406 may each receive a container from master host 208 that includes the network operating system necessary for establishing communication with network controller 202 (e.g., to send RPC messages). Master host 208 may also send additional containers to hosts 206, 306, and 406 to automate BGP configuration. For example, an additional container may enable execution of commands in a CLI.

Hosts 206, 306, and 406 receive containers from master host 208 and store them in memory. For example, host 406 may receive routing container 212 from master host 208 and store routing container 212 in memory 210. For simplicity, only the internal memory component of host 406 is shown. Although not depicted, hosts 206 and 306 also have internal memory components, comparable to memory 210, for storing routing containers. Memory 210 may be non-volatile memory (further described in FIG. 5). Although not depicted, hosts 206, 306, and 406 include other components that are described in FIG. 5.

In network 200, network controller 202 is connected to hosts 206, 306, and 406 and L3 devices 204 and 304. Host 206 and host 306 are to be peered with L3 device 204, whereas host 406 is to be peered with L3 device 304. In some embodiments, network controller 202 may already be aware of the data link layer and network layer identifiers of the network devices in network 200. For example, network controller 202 may store tables indicating the MAC addresses and IP addresses of hosts 206, 306, and 406 and L3 devices 204 and 304.

FIGS. 3 and 4 show illustrative tables 300 and 400, which list the data link layer and network layer identifiers of hosts and L3 devices in network 200. In an embodiment, tables 300 and 400 are stored in memory at network controller 202. In a scenario where L3 device 204 is to be peered with host 206, network controller 202 may receive a message from host 206, indicating the network layer identifier of host 206 (e.g., 192.168.1.1) and the data link layer identifier, as resolved using LLDP, of L3 device 204 (e.g., B1-11-11-B1-11-11). Network controller 202 performs a lookup of the received data link layer identifier in table 400. Based on the lookup, network controller 202 determines that the data link layer identifier corresponds to L3 device 204 and that the network layer identifier of L3 device 204 is 192.168.10.1. Suppose that the AS number is 200 for network 200. Network controller 202 accordingly transmits a message comprising commands for a BGP configuration with L3 device 204 to host 206. The commands may be:

switch(config) # router bgp 200
switch(config-router-bgp) # neighbor 192.168.10.1 remote-as 200
switch(config-router-bgp) #

To establish network layer connectivity completely, network controller 202 transmits another message comprising commands for a BGP configuration with host 206 to L3 device 204. In this case, the network layer identifier of host 206 is determined based on the message received from host 206. The commands sent to L3 device 204 may be:

switch(config) # router bgp 200
switch(config-router-bgp) # neighbor 192.168.1.1 remote-as 200
switch(config-router-bgp) #

Network 200 features multiple hosts and network layer devices. Network controller 202 may receive peering request messages from any of these network devices and provides the proper configuration messages in response. In an embodiment, to initiate the peering process between a host and an L3 device, network controller 202 waits for at least two messages originating from different devices that request to peer with one another. For example, network controller 202 may receive (1) a first message from L3 device 204 intending to peer with host 306, (2) a second message from L3 device 304 intending to peer with host 406, (3) a third message from host 306 intending to peer with L3 device 204, and (4) a fourth message from host 406 intending to peer with L3 device 304. Network controller 202 determines, by looking up the data link layer identifier in each message, whether two messages correspond to the same peering request. In this example, the first message and the third message both intend to establish network layer connectivity between host 306 and L3 device 204. The second message and the fourth message both intend to establish network layer connectivity between host 406 and L3 device 304. In response to determining these corresponding peering requests, network controller 202 transmits messages comprising commands for establishing BGP peering.

For example, network controller 202 may receive the first message indicating a data link layer identifier "A2-22-22-A2-22-22" and a network layer identifier "192.168.10.1." Network controller 202 performs a lookup in tables 300 and 400 to determine that the data link layer identifier is associated with host 306 and the network layer identifier is associated with L3 device 204. Network controller 202 may also receive the third message indicating a data link layer identifier "B1-11-11-B1-11-11" and a network layer identifier "192.168.1.2." Based on a lookup, network controller 202 determines that the data link layer identifier in the third message is associated with L3 device 204 and the network layer identifier is associated with host 306. Because the pair of devices in both messages is the same (the first message is a request from L3 device 204 to peer with host 306 and the second message is a request from host 306 to peer with L3 device 204), network controller 202 determines that the two network devices should be peered with each other.

Figure 5:
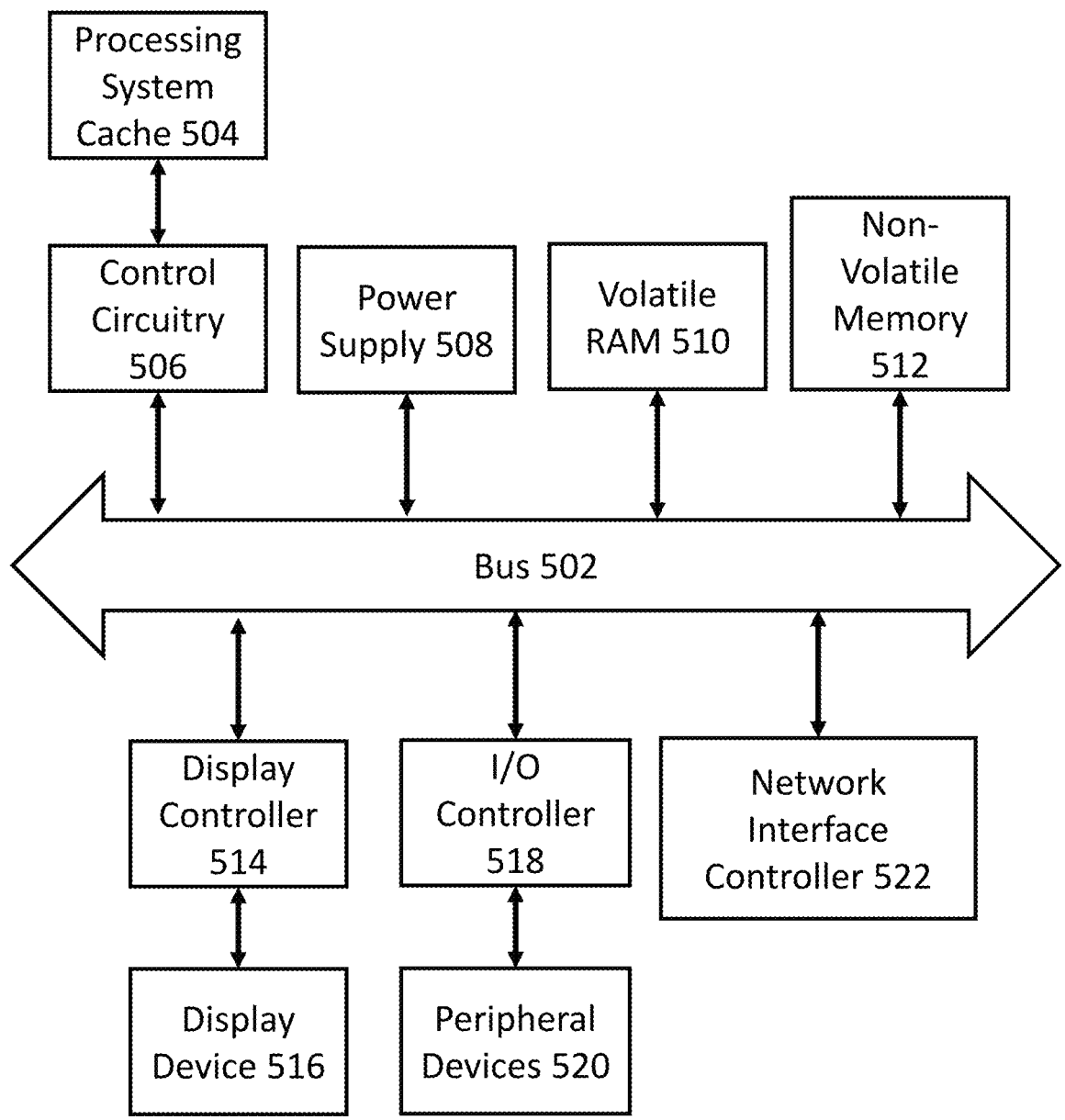
FIG. 5 shows an example of a network controller, which may be used in conjunction with the embodiments described herein.

FIG. 5 shows an exemplary computer system 500, which is a form of a data processing system. Computer system 500 can be a network controller, a host, or a network layer device. For example, the components shown in computer system 500 may be the same components found in network controller 202, master host 208, hosts 206, 306, 406, or L3 devices 204 and 304. These components include bus 502, which is coupled to power supply 508, control circuitry 506, processing system cache 504, volatile RAM 510 and non-volatile memory 512. Bus 502 interconnects components 504, 506, 508, 510, and 512 to display controller 514, display device 516, network interface controller (NIC) 522 and input/output (I/O) controller 518. I/O controller 518 may be a microchip or a plurality of microchips that enable the communication of data between bus 502 and peripheral devices 520, which may include mice, keyboards, printers and other devices which are well known in the art. Bus 502 may include one or more buses connected to each other through various bridges, controllers and/or adapters, as is well known in the art.

Control circuitry 506 may retrieve instructions from memories 504, 510, and 512 and execute the instructions to perform processes described herein. As referred to herein, control circuitry should be understood to mean circuitry based on one or more microprocessors, microcontrollers, digital signal processors, programmable logic devices, application-specific integrated circuits (ASICs), etc., and may include a multi-core processor (e.g., dual-core, quad-core, etc.). Control circuitry 506 may be used to send and receive commands, requests, and other suitable data using I/O controller 518, display controller 514, and/or network interface controller 522.

The processes taught by the discussion herein may be performed with program code, such as machine-executable instructions that cause a machine that executes these instructions to perform certain functions. In this context, a "machine" may be a machine that converts intermediate-form instructions into processor-specific instructions (e.g., an abstract execution environment such as a "process virtual machine" (e.g., a Java Virtual Machine), an interpreter, a Common Language Runtime, a high-level language virtual machine, etc.), and/or electronic circuitry on a semiconductor chip (e.g., "logic circuitry" implemented with transistors) designed to execute instructions, such as a general-purpose processor and/or a special-purpose processor. Processes taught by the discussion herein may also be performed by (in the alternative to a machine or in combination with a machine) electronic circuitry designed to perform the processes (or a portion thereof) without the execution of program code.

The present disclosure also relates to an apparatus for performing the processes described herein. This apparatus may be specially constructed for the required purpose, or it may comprise a general-purpose computer selectively activated or reconfigured by a computer program stored in computer system 500. The instructions for performing any of the embodiments discussed herein of the computer program may be encoded on non-transitory computer-readable media (e.g., a hard drive, random-access memory on a DRAM integrated circuit, read-only memory on a disk, etc.)

or transitory computer-readable media (e.g., propagating signals carrying data and/or instructions).

Volatile RAM (Random Access Memory) 510 is typically implemented as dynamic RAM (DRAM), which requires power continually in order to refresh or maintain the data in the memory. Non-volatile memory 512 is typically a magnetic hard drive or a magnetic optical drive, an optical drive, a flash memory, or other types of memory systems, which maintain data (e.g., large amounts of data) even after power is removed from computer system 500. Typically, non-volatile memory 512 will also be a random-access memory although this is not required. In the case where computer system 500 is a host (e.g., host 406), a routing container is stored in memory. For example, routing container 212 of host 406 may be stored in non-volatile memory 512 of host 406 (non-volatile memory 512 being equivalent to memory 210).

NIC 522 enables computer system 500 to connect to a computer network using a wireless or a wired connection. NIC 522 may be an expansion card that is plugged into bus 502 or may be built straight into the motherboard. In terms of a wireless connection, NIC 522 may utilize an antenna that serves as an interface between radio waves propagating through space and electric currents moving in metal conductors. During transmission, control circuitry 506 supplies an electric current to NIC 522, which radiates the energy from the electric current as electromagnetic waves via the antenna. During reception, the antenna of NIC 522 intercepts a radio wave in order to produce an electric current at its terminals for processing by control circuitry 506. In terms of a wired connection, NIC 522 may include physical layer interfaces such as an Ethernet copper interface or an Ethernet fiber interface. NIC 522 can include a forwarding engine to forward network data received on one interface out through another interface.

While FIG. 5 shows that non-volatile memory 512 is a local device coupled directly to the rest of the components in computer system 500, it will be appreciated that the present invention may utilize a non-volatile memory that is remote from computer system 500, such as a network storage device that is coupled to the computer system 500 through NIC 522.

Figure 6:
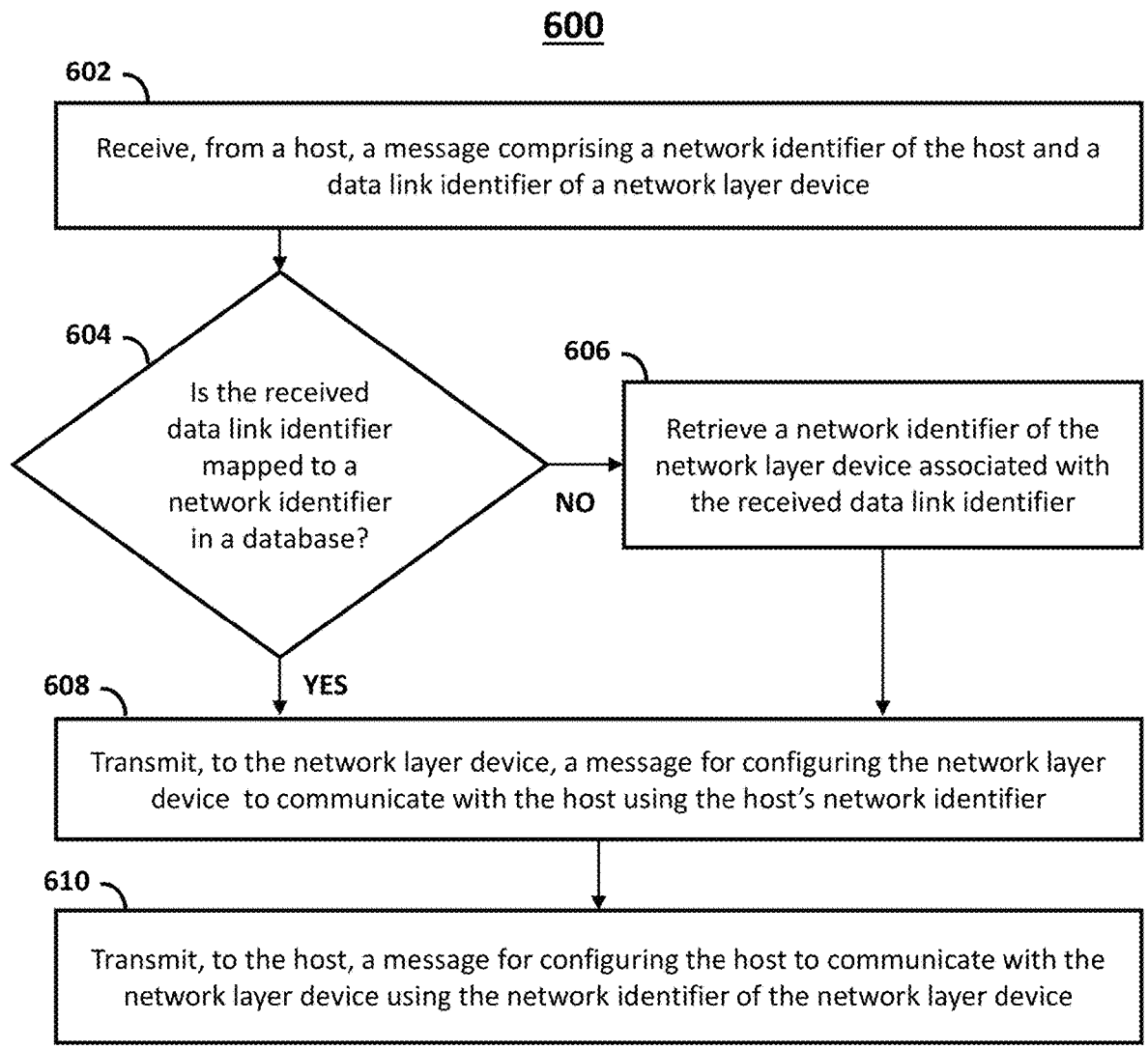
FIG. 6 is a flowchart of an illustrative process for configuring network layer connectivity between a network layer device and a host in response to receiving a message from a host, in accordance with some embodiments of the disclosure.

FIG. 6 is a flowchart of illustrative process 600 for configuring network layer connectivity between a network layer device and a host in response to receiving a message from a host, in accordance with some embodiments of the disclosure. Process 600 will be described in the context of network 200. It should be noted, however, that process 600 may also be implemented by the network devices in network 100 or other similar networks. At 602, control circuitry 506 of network controller 202 receives (e.g., by NIC 522), from host 406, a message comprising a network layer identifier of host 406 and a data link layer identifier of L3 device 304. For example, the message may be an RPC message requesting a routing configuration and may be communicated over a gRPC link between network controller 202 and host 406. The network layer identifier listed in the message is "192.168.1.3" and the data link layer identifier is "B2-22-22-B2-22-22."

At 604, control circuitry 506 of network controller 202 determines whether the data link layer identifier is mapped to a network layer identifier in a database stored at network controller 202 (e.g., in non-volatile memory 512). The database may be a combination of tables 300 and 400 depicted in FIGS. 3 and 4. Control circuitry 506 looks up "B2-22-22-B2-22-22" and determines that the data link layer identifier is associated with L3 device 304. Control circuitry 506 further determines that the network layer identifier of L3 device 304 is "192.168.10.2." Because the data link layer identifier is mapped to a network layer identifier, process 600 proceeds to 608, where control circuitry 506 of network controller 202 transmits, to identified L3 device 304, a message comprising the network layer identifier of host 406. In some embodiments, the message transmitted to L3 device 304 includes commands for establishing network layer peering between host 406 and L3 device 304. For example, the message may include the following instructions for establishing BGP peering:
switch(config) # router bgp 200
switch(config-router-bgp) # neighbor 192.168.1.3 remote-as 200
switch(config-router-bgp) #

The message is received by control circuitry 506 of L3 device 304, which executes the commands in the message in a CLI to establish communications with host 406 over the network layer. In some embodiments, the message does not include commands and simply provides the network layer identifier of host 406 to L3 device 304. L3 device 304 stores this network layer identifier of host 406 in a routing table at L3 device 304.

At 610, control circuitry 506 of network controller 202 transmits a message to host 406, the message indicating the network layer identifier of L3 device 304. As mentioned before, the message may simply inform host 406 of the network layer identifier. Host 406 may thus store the network layer identifier in a routing table at host 406. The message may also include commands for establishing network layer peering at host 406 with L3 device 304. For example, the message may include the following instructions for establishing BGP peering:
switch(config) # router bgp 200
switch(config-router-bgp) # neighbor 192.168.10.2 remote-as 200
switch(config-router-bgp) #

The message is received by control circuitry 506 of host 406, which executes the commands in the message in a CLI to establish communications with L3 device 304 over the network layer.

In some cases, network controller 202 may not have pre-stored network or data link layer identifiers in a database. For example, at 604, network controller 202 may perform a lookup of "B2-22-22-B2-22-22" and be unable to find the data link layer identifier in the database. In response to determining that the data link layer identifier is not mapped to a network layer identifier in the database, process 600 proceeds to 606 where control circuitry 506 of network controller 202 retrieves a network layer identifier of the L3 device associated with the received data link layer identifier. Control circuitry 506 of network controller 202 may, for example, communicate with L3 device 304 using the MAC address "B2-22-22-B2-22-22" and request the network layer identifier of L3 device 304. In response to receiving a message from L3 device 304 indicating the network layer identifier, control circuitry 506 may store the network layer identifier and the data link layer identifier in the database (e.g., in non-volatile memory 512). Process 600 subsequently proceeds to 608.

Figure 7:
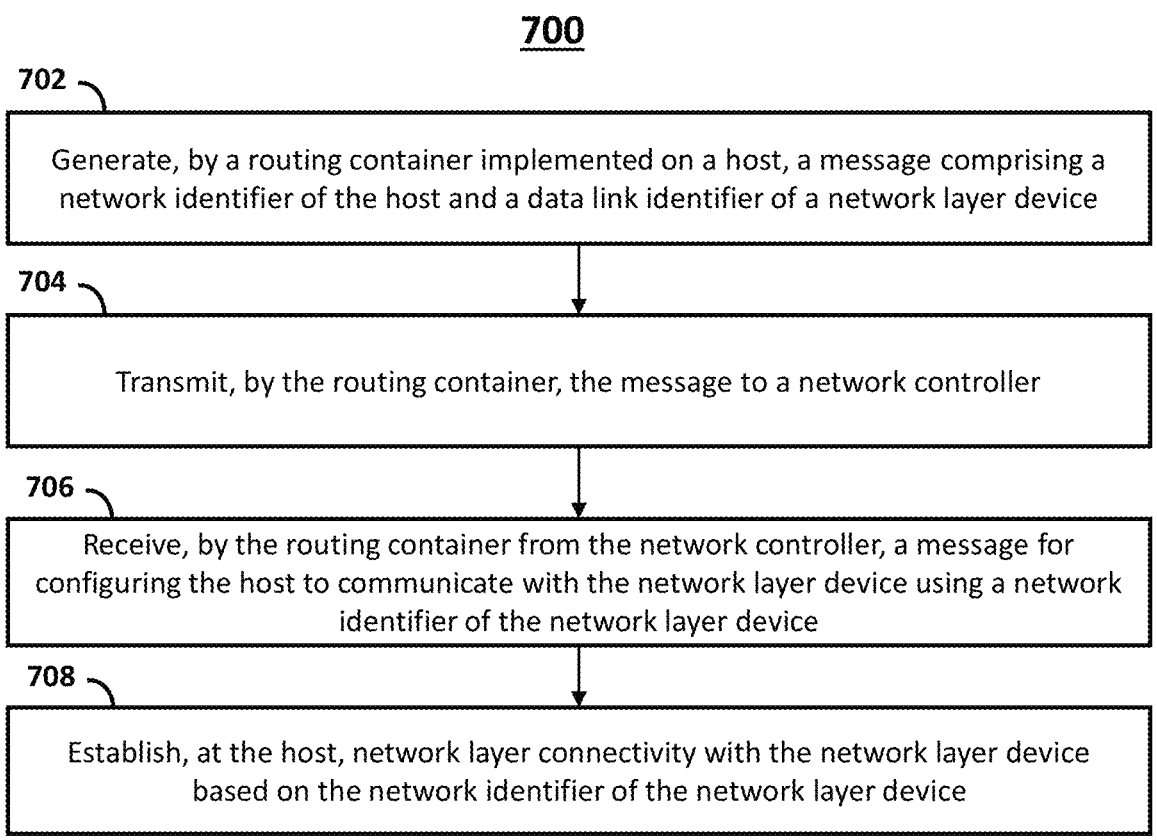
FIG. 7 is a flowchart of an illustrative process for establishing network layer connectivity between a network layer device and a host using a routing container, in accordance with some embodiments of the disclosure.

FIG. 7 is a flowchart of illustrative process 700 for establishing network layer connectivity between a network layer device and a host using a routing container, in accordance with some embodiments of the disclosure. The examples thus far have primarily been from the perspective of a network controller. Process 700 occurs in a container network and is executed using a container on a host. Process 700 will be described in the context of network 200, but may also be implemented by the network devices in network 100 or a similar network. At 702, routing container 212 implemented on host 406 generates a message comprising a network layer identifier of host 406 and a data link layer identifier of L3 device 304. As mentioned before, a host is conventionally unable to communicate with network controller 202. Master host 208, which deploys containers holding applications with their dependencies (allowing the applications to run in isolation of an operating system), transmits routing container 212 to host 406 for storage in memory 210 (interchangeable with non-volatile memory 512). Routing container 212 is specifically implemented by control circuitry 506 on host 406 and allows host 406 to transmit RPC messages to network controller 202. Routing container 212 generates the message comprising the network and data link layer identifiers to request a routing configuration from network controller 202. At 704, routing container 212 transmits the message to network controller 202 (e.g., over a gRPC link).

At 706, routing container 212 receives from network controller 202, a message for configuring host 406 to communicate with L3 device 304 using a network layer identifier of L3 device 304. For example, routing container 212 may receive a message comprising the following exemplary commands for establishing BGP peering with L3 device 304:
switch(config) # router bgp 200
switch(config-router-bgp) # neighbor 192.168.10.2 remote-as 200
switch(config-router-bgp) #

At 708, routing container 212 establishes, at host 406, network layer connectivity with L3 device 304 based on the network layer identifier of L3 device 304. For example, routing container 212 may execute the received commands in a CLI at the host.

Figure 8:
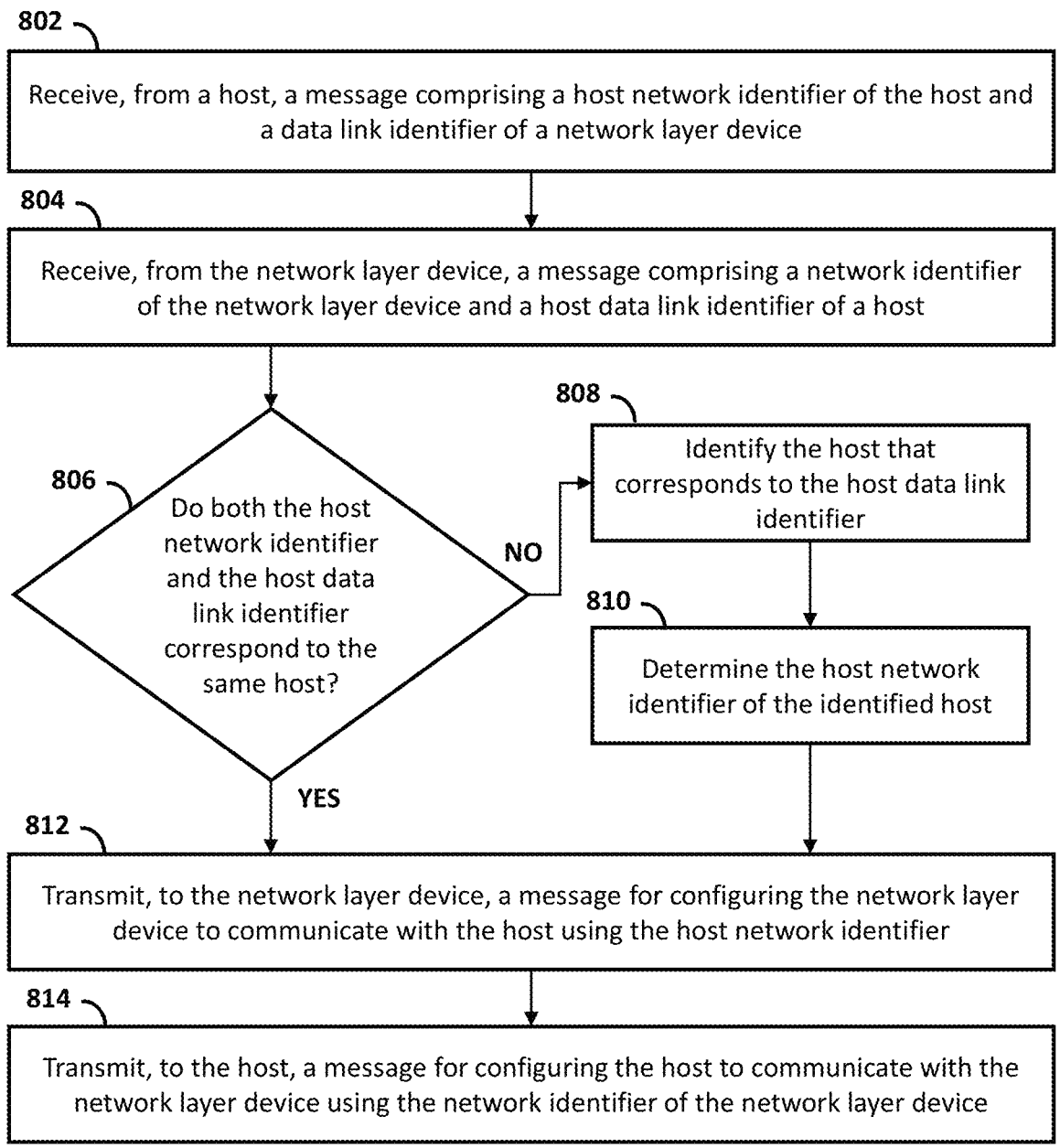
FIG. 8 is a flowchart of an illustrative process for configuring network layer connectivity between a network layer device and a host in response to receiving a message from the host and a message from the network layer device, in accordance with some embodiments of the disclosure.

FIG. 8 is a flowchart of illustrative process 800 for configuring network layer connectivity between a network layer device and a host, in response to receiving a message from the host and a message from the network layer device, in accordance with some embodiments of the disclosure. Process 800 will be described in the context of network 200, but may also be implemented by the network devices in network 100 or a similar network. At 802, control 5 circuitry 506 of network controller 202 receives from a host, such as host 206, a message comprising a host network layer identifier of host 206 and a data link layer identifier of L3 device 204. At 804, control circuitry 506 of network controller 202 receives, from L3 device 204, a message comprising a network layer identifier of L3 device 204 and a host data link layer identifier of host 206.

At 806, control circuitry 506 of network controller 202 determines whether the host network layer identifier received from host 306 and the host data link layer identifier received from L3 device 204 correspond to the same host. For example, control circuitry 506 may perform a lookup of the host network layer identifier (e.g., 192.168.1.1) in a database comprising tables 300 and 400 (as shown in FIGS. 3 and 4). Based on the lookup, control circuitry 506 determines that the host network layer identifier is associated with host 206. Control circuitry 506 performs another lookup of the host data link layer identifier (e.g., A1-11-11-A1-11-11) and determines that the host data link layer identifier is also associated with host 206. In response to determining that the respective host identifiers correspond to host 206, process 800 proceeds to 812, where control circuitry 506 of network controller 202 transmits, to L3 device 204, a message for configuring L3 device 204 to communicate with host 206 using the host network layer identifier of host 206. At 814, control circuitry 506 of network controller 202 transmits, to host 206, a message for configuring host 206 to communicate with L3 device 204 using the network layer identifier of L3 device 204.

At 806, control circuitry 506 of network controller 202 performs a lookup at each entry in the database. In the example previously given, at 804, control circuitry 506 of network controller 202 receives from L3 device 204, a message comprising a network layer identifier of L3 device 204 and a host data link layer identifier of host 206. It is possible, however, that the host data link layer identifier received from L3 device 204 is of host 306 (e.g., A2-22-22-A2-22-22). Therefore, at 806, control circuitry 506 determines that the host data link layer identifier received from L3 device 204 and the host network layer identifier received from host 206 do not correspond to the same host. In response to this determination, process 800 proceeds to 808 where control circuitry 506 identifies the host that corresponds to the received host data link layer identifier. For example, control circuitry 506 performs a lookup in the database comprising tables 300 and 400 to determine that the host data link layer identifier of "A2-22-22-A2-22-22" is associated with host 306. At 810, control circuitry 506 determines the host network layer identifier of the identified host. For example, control circuitry 506 determines that, as listed in the database, the network layer identifier of host 306 is "192.168.1.2." From 810, process 800 proceeds to 812 where control circuitry 506 transmits a message to L3 device 204 that comprises the network layer identifier of host 306. The respective hosts and L3 device establish network layer connectivity using these messages. Thus, peering is enabled between host 206 and L3 device 204 as well as between host 306 and L3 device 204.

Figure 9:
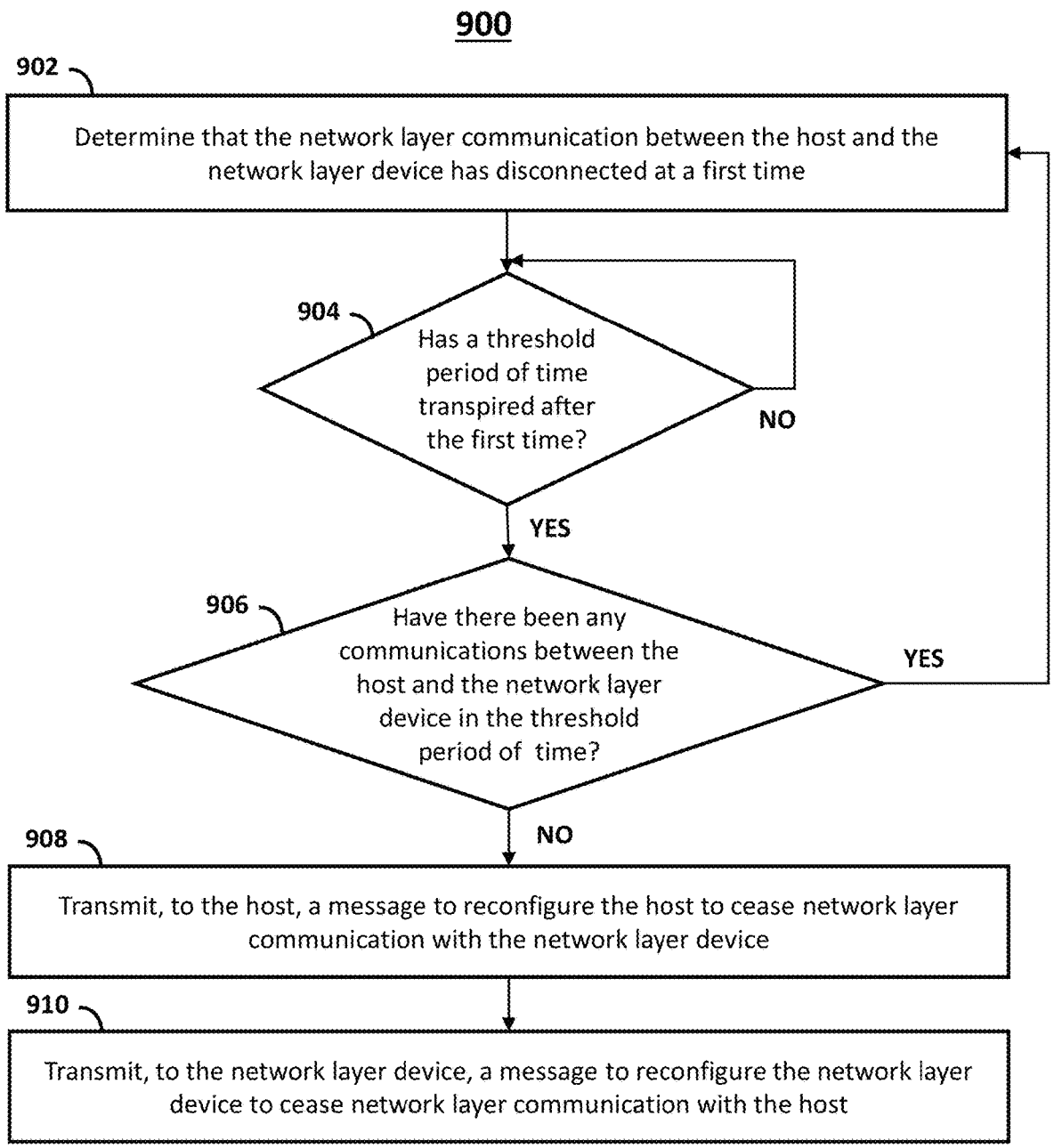
FIG. 9 is a flowchart of an illustrative process for ceasing the network layer connectivity between a network layer device and a host, in accordance with some embodiments of the disclosure.

FIG. 9 is a flowchart of illustrative process 900 for ceasing the network layer connectivity between a network layer device and a host, in accordance with some embodiments of the disclosure. Process 900 will be described in the context of network 200, but may also be implemented by the network devices in network 100. At 902, control circuitry 506 of network controller 202 determines that the network layer communication between a host, such as host 306, and a network layer device, such as L3 device 204, has disconnected at a first time (e.g., 3:00:00 pm). For example, using streaming network telemetry, network controller 202 continuously collects real-time data regarding network 200's health from network devices such as L3 device 204. The real-time data may include information such as time stamps of communication between host 306 and L3 device 204. Control circuitry 506 of network controller 202 identifies the last communication exchanged between the respective network devices and determines a time stamp of the last communication.

At 904, control circuitry 506 of network controller 202 determines whether a threshold period of time has transpired after the first time of the time stamp. The threshold period of time may be a pre-determined value stored at network controller 202 (e.g., in non-volatile memory 512). For example, the threshold period of time may be 60 seconds. Control circuitry 506 continues to loop at 904 until 60 seconds have transpired. In response to determining that the threshold period of time has transpired, process 900 proceeds to 906 where control circuitry 506 determines whether there have been any communications between host 306 and L3 device 204 during the threshold period of time. In response to determining that there have been communications, control circuitry 506 determines that a time-out has not occurred and may return to 902 in anticipation of the next time network layer communication has timed out. In response to determining, however, that there have not been any communications between host 306 and L3 device 204 during the threshold period of time, process 900 proceeds to 908.

Network controller 202 may also implement 904 and 906 using keepalive messages. For example, control circuitry 506 of network controller 202 may send messages to both host 306 and L3 device 204, the messages comprising commands for dissolving the BGP peering previously established. Exemplary commands may be:
switch(config-router-bgp) # timers bgp 20 60
switch(config-router-bgp) #
BGP neighbors maintain network layer connections by exchanging keepalive messages which indicate the amount of time to wait for incoming BGP messages. Neighbors that do not receive a keepalive message from a peer within a hold time (e.g., the threshold period of time) can end the BGP session with that peer. In the command above, the hold time is set to 60 seconds and the keepalive time is set to 20 seconds. As a result, the respective network devices will exchange keepalive messages every 20 seconds. Should a keepalive message not be received after a hold time has transpired, L3 device 204 removes all prefixes received over the terminated session, and reroutes traffic over other available paths.

At 908, control circuitry 506 transmits, to host 306, a message to reconfigure host 306 to cease network layer communication with L3 device 204. The message may, for example, include commands for shutting down the previously established BGP session with L3 device 204 (with a network layer identifier "192.168.10.1"). Exemplary commands may be:
switch(config) # router bgp 200
switch(config-router-bgp) # neighbor 192.168.10.1 shutdown
switch(config-router-bgp) #

At 910, control circuitry 506 transmits, to L3 device 204, a message to reconfigure L3 device 204 to cease network layer communication with host 306. Referring to table 300, the network layer identifier of host 306 is 192.168.1.2. Thus, the message may include commands such as:
switch(config) # router bgp 200
switch(config-router-bgp) # neighbor 192.168.1.2 shutdown
switch(config-router-bgp) #

It should be noted that processes 600-900 or any step thereof could be performed on, or provided by, any of the components shown in FIG. 5. For example, the processes may be executed by control circuitry 506 (FIG. 5). In addition, one or more steps of a process may be incorporated into or combined with one or more steps of any other process or embodiment (e.g., steps from process 600 may be combined with steps from process 700). In addition, the steps and descriptions described in relation to FIGS. 6-9 may be done in alternative orders or in parallel to further the purposes of this disclosure. For example, each of these steps may be performed in any order or in parallel or substantially simultaneously to reduce lag or increase the speed of the system or method.

The processes discussed herein are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. In addition, the systems and methods described herein may be performed in real time. It should also be noted, the systems and/or methods described herein may be applied to, or used in accordance with, other systems and/or methods.

What is claimed is:

1. A method for configuring network layer connectivity between a network layer device and a host, the method comprising:
  receiving, at a network controller from the host, a message comprising a host network layer identifier of the host and a data link layer identifier of the network layer device;
  determining, at the network controller, a network layer identifier of the network layer device from the data link layer identifier;
  transmitting, from the network controller to the host, a message for configuring the host to communicate with the network layer device using the network layer identifier of the network layer device; and
  transmitting, from the network controller to the network layer device, a message for configuring the network layer device to communicate with the host using the host network layer identifier of the host.

2. The method of claim 1, further comprising:
  receiving, at the network controller from the network layer device, a message comprising the network layer identifier of the network layer device and a host data link layer identifier of the host,
  wherein determining the network layer identifier from the data link layer identifier is based on the received network layer identifier of the network layer device.

3. The method of claim 2, wherein the host network layer identifier is a first host network layer identifier, the method further comprising:
  determining, at the network controller, a second host network layer identifier from the host data link layer identifier; and
  determining whether the first host network layer identifier matches the second host network layer identifier,
  wherein transmitting, from the network controller to the network layer device, the message for configuring the network layer device to communicate with the host using the first host network layer identifier is in response to determining that the first host network layer identifier matches the second host network layer identifier.

4. The method of claim 1, wherein determining the network layer identifier from the data link layer identifier comprises:
  retrieving, at the network controller, a table that maps nodes to network layer identifiers and data link layer identifiers;
  identifying, in the table, an entry of the network layer device associated with the data link layer identifier; and
  determining, based on the table, the network layer identifier of the identified network layer device.

5. The method of claim 1, wherein the message transmitted by the network controller to the network layer device is utilized by the network layer device to establish network layer communication with the host in accordance with a routing protocol.

6. The method of claim 5, further comprising:
- determining, at the network controller, that the network layer communication between the host and the network layer device has disconnected at a first time;
- determining whether a threshold period of time has transpired since the first time; and
- in response to determining that the threshold period of time has transpired since the first time, transmitting, from the network controller to the host, a message to reconfigure the host to cease network layer communication with the network layer device.

7. The method of claim 6, further comprising, in response to determining that the threshold period of time has transpired since the first time, transmitting, from the network controller to the network layer device, a message to reconfigure the network layer device to cease network layer communication with the host.

8. A system for configuring network layer connectivity between a network layer device and a host, the system comprising:
- control circuitry configured to:
  - receive, from the host, a message comprising a host network layer identifier of the host and a data link layer identifier of the network layer device;
  - determine a network layer identifier of the network layer device from the data link layer identifier;
  - transmit, to the host, a message for configuring the host to communicate with the network layer device using the network layer identifier of the network layer device; and
  - transmit, to the network layer device, a message for configuring the network layer device to communicate with the host using the host network layer identifier of the host.

9. The system of claim 8, wherein the control circuitry is further configured to:
- receive, from the network layer device, a message comprising the network layer identifier of the network layer device and a host data link layer identifier of the host,
- wherein the control circuitry is configured to determine the network layer identifier from the data link layer identifier based on the received network layer identifier of the network layer device.

10. The system of claim 9, wherein the host network layer identifier is a first host network layer identifier, wherein the control circuitry is further configured to:
- determine a second host network layer identifier from the host data link layer identifier; and
- determine whether the first host network layer identifier matches the second host network layer identifier,
- wherein the control circuitry is further configured to transmit, to the network layer device, the message for configuring the network layer device to communicate with the host using the first host network layer identifier in response to determining that the first host network layer identifier matches the second host network layer identifier.

11. The system of claim 8, wherein the control circuitry is further configured to determine the network layer identifier from the data link layer identifier by:
- retrieving a table that maps nodes to network layer identifiers and data link layer identifiers;
- identifying, in the table, an entry of the network layer device associated with the data link layer identifier; and
- determining, based on the table, the network layer identifier of the identified network layer device.

12. The system of claim 8, wherein the message transmitted to the network layer device is utilized by the network layer device to establish network layer communication with the host in accordance with a routing protocol.

13. The system of claim 12, wherein the control circuitry is further configured to:
- determine that the network layer communication between the host and the network layer device has disconnected at a first time;
- determine whether a threshold period of time has transpired since the first time; and
- in response to determining that the threshold period of time has transpired since the first time, transmit, to the host, a message to reconfigure the host to cease network layer communication with the network layer device.

14. The system of claim 13, wherein the control circuitry is further configured, in response to determining that the threshold period of time has transpired since the first time, to transmit, to the network layer device, a message to reconfigure the network layer device to cease network layer communication with the host.

15. A non-transitory computer-readable storage medium in a system for configuring network layer connectivity between a network layer device and a host, the non-transitory computer-readable storage medium having stored thereon computer executable instructions, which when executed by a computer device of the system, cause the computer device to:
- receive, from the host, a message comprising a host network layer identifier of the host and a data link layer identifier of the network layer device;
- determine a network layer identifier of the network layer device from the data link layer identifier;
- transmit, to the host, a message for configuring the host to communicate with the network layer device using the network layer identifier of the network layer device; and
- transmit, to the network layer device, a message for configuring the network layer device to communicate with the host using the host network layer identifier of the host.

16. The non-transitory computer-readable storage medium of claim 15, wherein the computer executable instructions, which when executed by the computer device, further cause the computer device to:
- receive, from the network layer device, a message comprising the network layer identifier of the network layer device and a host data link layer identifier of the host; and
- determine the network layer identifier from the data link layer identifier based on the received network layer identifier of the network layer device.

17. The non-transitory computer-readable storage medium of claim 16, wherein the host network layer identifier is a first host network layer identifier, wherein the computer executable instructions, which when executed by the computer device, further cause the computer device to:
- determine a second host network layer identifier from the host data link layer identifier;
- determine whether the first host network layer identifier matches the second host network layer identifier; and
- transmit, to the network layer device, the message for configuring the network layer device to communicate with the host using the first host network layer identifier in response to determining that the first host network layer identifier matches the second host network layer identifier.

18. The non-transitory computer-readable storage medium of claim 15, wherein to determine the network layer identifier from the data link layer identifier includes:
- retrieving a table that maps nodes to network layer identifiers and data link layer identifiers;
- identifying, in the table, an entry of the network layer device associated with the data link layer identifier; and
- determining, based on the table, the network layer identifier of the identified network layer device.

19. The non-transitory computer-readable storage medium of claim 15, wherein the message transmitted to the network layer device is utilized by the network layer device to establish network layer communication with the host in accordance with a routing protocol.

20. The non-transitory computer-readable storage medium of claim 19, wherein the computer executable instructions, which when executed by the computer device, further cause the computer device to:
- determine that the network layer communication between the host and the network layer device has disconnected at a first time;
- determine whether a threshold period of time has transpired since the first time; and
- in response to determining that the threshold period of time has transpired since the first time, transmit, to the host, a message to reconfigure the host to cease network layer communication with the network layer device.

* * * * *